United States Patent
Ito

(10) Patent No.: US 10,463,185 B2
(45) Date of Patent: Nov. 5, 2019

(54) DRAINING RACK FOR CLEANING SPONGE

(71) Applicant: Koshin co., Ltd., Tokyo (JP)

(72) Inventor: Kenji Ito, Tokyo (JP)

(73) Assignee: Koshin co., Ltd., Tokyo (JP)

( * ) Notice: Subject to any disclaimer, the term of this patent is extended or adjusted under 35 U.S.C. 154(b) by 0 days.

(21) Appl. No.: 15/988,153

(22) Filed: May 24, 2018

(65) Prior Publication Data

US 2018/0344066 A1    Dec. 6, 2018

(30) Foreign Application Priority Data

May 30, 2017    (JP) .................................. 2017-106083

(51) Int. Cl.
*A47G 29/087*    (2006.01)
*A47L 13/146*    (2006.01)
(Continued)

(52) U.S. Cl.
CPC ............ *A47G 29/087* (2013.01); *A47J 47/20* (2013.01); *A47L 13/146* (2013.01); *A47L 13/51* (2013.01);
(Continued)

(58) Field of Classification Search
CPC ........ A47L 19/04; A47L 13/146; A47L 13/51; A47L 17/04; A47G 29/087; A47J 47/20; F16B 47/00
USPC ......... 211/195, 47, 48, 80, 81, 96, 116, 165, 211/168, 169, 41.1–41.6, 181.1, 87.01, 211/90.03, 85.31, 106, 119, 119.009; 248/302, 683, 205.5, 205.6, 205.7, 206.3, 248/206.4, 363
See application file for complete search history.

(56) References Cited

U.S. PATENT DOCUMENTS 318,252 A * 5/1885 Holmes .................. A47B 43/04
  312/5
487,110 A * 11/1892 Best .......................... A47F 7/16
  211/48
(Continued)

FOREIGN PATENT DOCUMENTS

EP    0074786 A1    3/1983
EP    1275336 A1    1/2003
(Continued)

OTHER PUBLICATIONS

Extended European Search Report dated Nov. 21, 2018 issued in European Patent Application No. EP18174742.9 (7 pages).

*Primary Examiner* — Jonathan Liu
*Assistant Examiner* — Devin K Barnett
(74) *Attorney, Agent, or Firm* — Nakanishi IP Associates, LLC

(57) ABSTRACT

A draining rack is configured including a fixed rack and a movable rack supported such that it can be tilted with respect to the fixed rack. The movable rack is supported by the fixed rack such that it can be tilted (rotated) between an upright position at which it stands upright on the front side of the fixed rack and a tilted position at which it is tilted from the upright position. By rotating the movable rack from the tilted position to the upright position in a state in which a cleaning sponge is held (interposed) between the fixed rack and the movable rack, this arrangement is capable of squeezing the cleaning sponge. This allows the draining time for the cleaning sponge to be reduced.

5 Claims, 3 Drawing Sheets

(51) Int. Cl.
*A47J 47/20* (2019.01)
*A47L 13/51* (2006.01)
*A47L 17/04* (2006.01)
*F16B 47/00* (2006.01)
*A47L 19/04* (2006.01)

(52) U.S. Cl.
CPC .............. *A47L 17/04* (2013.01); *A47L 19/04* (2013.01); *F16B 47/00* (2013.01)

(56) References Cited

U.S. PATENT DOCUMENTS

| | | | | |
|---|---|---|---|---|
| 545,551 A * | 9/1895 | Tanquary | ............... | B65B 67/12 248/99 |
| 759,025 A * | 5/1904 | Schiele | .................... | A47F 5/01 160/352 |
| 819,989 A * | 5/1906 | Gilbert | .................... | A47F 7/16 211/48 |
| 1,039,694 A * | 10/1912 | Burton | .................... | A47F 5/13 108/163 |
| 1,088,128 A * | 2/1914 | Cleary | .................... | A47F 7/163 211/182 |
| 1,274,172 A * | 7/1918 | Lee | ............................ | A47F 5/01 211/106 |
| 1,364,509 A * | 1/1921 | Nielson | .............. | A47G 25/0685 108/134 |
| 1,453,437 A * | 5/1923 | Burnham | ................ | A47L 19/04 211/41.3 |
| 1,456,446 A * | 5/1923 | Hotaling | ................ | A47F 7/148 211/181.1 |
| 1,465,891 A * | 8/1923 | Breuninger | ............ | A47F 7/148 211/181.1 |
| 1,681,418 A * | 8/1928 | Livesay | ............... | A47G 25/743 211/106 |
| 1,752,985 A * | 4/1930 | Huffman | ................... | A47F 5/13 211/106 |
| 1,835,535 A * | 12/1931 | Stocker | .................. | A47L 19/04 123/71 R |
| 2,068,028 A * | 1/1937 | Jernson | .................. | D06F 57/12 211/104 |
| 2,675,130 A * | 4/1954 | Dore | ...................... | A47G 25/18 211/118 |
| 2,680,522 A * | 6/1954 | Temple | .................... | A47F 5/13 108/59 |
| 2,682,956 A * | 7/1954 | Pike | ...................... | A47F 5/0876 211/181.1 |
| 2,917,184 A * | 12/1959 | Beall, Jr. | ................. | A47J 47/16 211/81 |
| 2,958,424 A * | 11/1960 | Bigatti | .................... | A47L 19/00 211/104 |
| 3,168,276 A * | 2/1965 | Schneider | ............... | F16B 47/00 211/48 |
| 3,178,033 A * | 4/1965 | Wirsing | ................. | A47K 10/14 211/119.009 |
| 3,181,702 A * | 5/1965 | Raphaei | ................. | A47K 3/281 211/119 |
| 3,186,559 A * | 6/1965 | Glowa | .................. | A47B 57/045 108/6 |
| 3,207,319 A * | 9/1965 | Best | .......................... | A47F 7/16 211/124 |
| 3,235,096 A * | 2/1966 | Hallock | .................... | A21B 3/00 211/149 |
| 3,295,471 A * | 1/1967 | Cook | .......................... | A47F 5/13 108/163 |
| 3,591,120 A * | 7/1971 | Fietzer | ................. | A47K 10/185 211/106 |
| 3,659,722 A * | 5/1972 | Carroll | ................. | A47B 73/002 211/106 |
| 3,817,395 A * | 6/1974 | LeFever | ................ | A47F 5/0037 211/170 |
| 3,993,002 A * | 11/1976 | Stroh | ........................ | A47F 5/13 108/108 |
| 4,099,760 A * | 7/1978 | Mascotte | ................ | B60R 19/52 224/402 |
| 4,133,432 A * | 1/1979 | Den Blaker | ............ | A47J 47/16 211/181.1 |
| 4,140,221 A * | 2/1979 | Garland | .................. | A47F 7/148 211/181.1 |
| 4,232,791 A * | 11/1980 | Howard | ................... | A47F 7/163 211/169.1 |
| 4,340,144 A * | 7/1982 | Cousins | .................. | A47F 5/083 211/106 |
| 4,387,811 A * | 6/1983 | Ragir | ..................... | A47B 55/02 211/106 |
| 4,492,169 A * | 1/1985 | Ware | ....................... | A47B 57/52 108/108 |
| 4,498,592 A * | 2/1985 | Colucci | ................... | A47F 7/148 211/106 |
| 4,702,380 A * | 10/1987 | Herman | ................... | A47F 5/083 211/181.1 |
| 4,712,692 A * | 12/1987 | Peinsipp | ................ | D06F 57/12 211/119 |
| 4,884,702 A * | 12/1989 | Rekow | ..................... | A47F 5/01 211/90.02 |
| 5,024,410 A * | 6/1991 | Ripley | ..................... | G09F 7/18 211/119 |
| 5,039,046 A * | 8/1991 | Brewster | .................... | A47F 7/28 248/105 |
| 5,069,350 A * | 12/1991 | Wolff | .................... | A47F 5/0807 211/106.01 |
| 5,125,517 A * | 6/1992 | Martinell | ................. | B62H 3/12 211/17 |
| 5,230,282 A * | 7/1993 | Barnes | .................. | B65B 27/083 100/34 |
| 5,299,698 A * | 4/1994 | Gay | ......................... | A47B 55/02 108/193 |
| 5,325,973 A * | 7/1994 | Reedy | ..................... | A47B 81/00 211/106 |
| 5,373,951 A * | 12/1994 | Arnold | .................... | D06F 57/12 211/106 |
| 5,435,295 A * | 7/1995 | Gerrard | ................... | F24B 1/193 126/152 B |
| 5,505,318 A * | 4/1996 | Goff | ........................ | A47B 46/00 211/132.1 |
| 5,547,088 A * | 8/1996 | Belokin | ................. | A47B 96/06 211/103 |
| 5,588,543 A * | 12/1996 | Finger | ..................... | A47F 5/083 211/106 |
| 5,620,105 A * | 4/1997 | Macek | ................... | A47K 3/001 211/119 |
| 5,634,760 A * | 6/1997 | Anderson | .............. | B65G 1/133 211/119 |
| D391,776 S * | 3/1998 | Olender | ........................ | D6/335 |
| 5,871,115 A * | 2/1999 | Kohn | ....................... | A47F 5/01 206/506 |
| 6,012,594 A * | 1/2000 | Heinz | .................... | A47B 97/02 211/106 |
| 6,299,001 B1 * | 10/2001 | Frolov | .................... | A47F 5/01 211/106 |
| 6,412,647 B1 * | 7/2002 | Ko | ........................... | A47B 55/02 211/106 |
| 6,464,087 B1 * | 10/2002 | Klein | ..................... | A47B 96/16 211/113 |
| 6,564,950 B1 * | 5/2003 | Holm | .................... | A47B 55/02 211/106 |
| 6,886,792 B2 * | 5/2005 | Immerman | ............. | F16B 47/00 211/106 |
| 7,137,516 B2 * | 11/2006 | Perry | ..................... | A47F 5/083 211/106 |
| 7,198,160 B2 * | 4/2007 | Ernst | ..................... | A47F 5/01 211/126.8 |
| 7,475,785 B1 * | 1/2009 | Kidd | ..................... | A47L 19/02 211/200 |
| 7,644,826 B2 * | 1/2010 | Koch | .................... | A47L 15/503 211/41.4 |
| 7,708,156 B2 * | 5/2010 | Johnson | ................. | A47B 57/487 211/103 |

(56) References Cited

U.S. PATENT DOCUMENTS

| | | | | |
|---|---|---|---|---|
| 7,931,161 B2* | 4/2011 | Newbould | | A47K 3/281 |
| | | | | 211/106 |
| 8,474,561 B2* | 7/2013 | Allingham | | B60R 9/06 |
| | | | | 180/89.11 |
| 8,540,088 B2* | 9/2013 | Brasher | | A47F 5/083 |
| | | | | 211/106 |
| 8,636,156 B2* | 1/2014 | Malik | | A47B 57/04 |
| | | | | 211/106 |
| 9,132,867 B1* | 9/2015 | Kiesow | | D06F 57/12 |
| 9,737,141 B2* | 8/2017 | Johnson | | A47B 55/02 |
| D800,634 S * | 10/2017 | Evans | | D12/407 |
| 10,058,172 B2* | 8/2018 | Staib | | A47F 5/13 |
| 2002/0008074 A1* | 1/2002 | Spencer | | A47F 7/148 |
| | | | | 211/49.1 |
| 2002/0148795 A1* | 10/2002 | Miller, Jr. | | A47F 3/0486 |
| | | | | 211/88.01 |
| 2003/0010736 A1* | 1/2003 | Hope | | D06F 58/04 |
| | | | | 211/133.5 |
| 2004/0007549 A1* | 1/2004 | Klein | | A47B 55/02 |
| | | | | 211/118 |
| 2004/0011752 A1* | 1/2004 | Zadak | | A47B 57/42 |
| | | | | 211/90.03 |
| 2004/0100045 A1* | 5/2004 | Amacker | | B60R 9/06 |
| | | | | 280/30 |
| 2004/0149668 A1* | 8/2004 | Fann | | A47B 73/002 |
| | | | | 211/74 |
| 2004/0188369 A1* | 9/2004 | Yu | | A47K 5/04 |
| | | | | 211/106 |
| 2005/0258117 A1* | 11/2005 | Drake | | A47B 46/005 |
| | | | | 211/106 |
| 2005/0263466 A1* | 12/2005 | Libman | | A47F 5/0815 |
| | | | | 211/106 |
| 2006/0091092 A1* | 5/2006 | Vosbikian | | A47F 5/01 |
| | | | | 211/87.01 |
| 2006/0180557 A1* | 8/2006 | Weinstein | | A47B 55/02 |
| | | | | 211/40 |
| 2007/0210019 A1* | 9/2007 | Schnitzer | | A47L 19/04 |
| | | | | 211/41.6 |
| 2007/0295681 A1* | 12/2007 | Colin | | A47F 5/12 |
| | | | | 211/90.03 |
| 2008/0000859 A1* | 1/2008 | Yang | | A47B 57/26 |
| | | | | 211/90.02 |
| 2008/0047913 A1* | 2/2008 | Naden | | A47K 3/281 |
| | | | | 211/119.009 |
| 2008/0283480 A1* | 11/2008 | Segall | | A47L 19/02 |
| | | | | 211/41.6 |
| 2012/0175325 A1* | 7/2012 | Del Grippo | | A47J 43/24 |
| | | | | 211/59.4 |
| 2014/0132136 A1 | 5/2014 | Kilic et al. | | |
| 2015/0305594 A1* | 10/2015 | Jarl | | A47B 81/04 |
| | | | | 211/41.5 |
| 2017/0231388 A1* | 8/2017 | Will | | A47B 95/008 |
| | | | | 211/106 |

FOREIGN PATENT DOCUMENTS

| | | |
|---|---|---|
| GB | 101263 A | 8/1916 |
| JP | 2012-228386 A | 11/2012 |

* cited by examiner

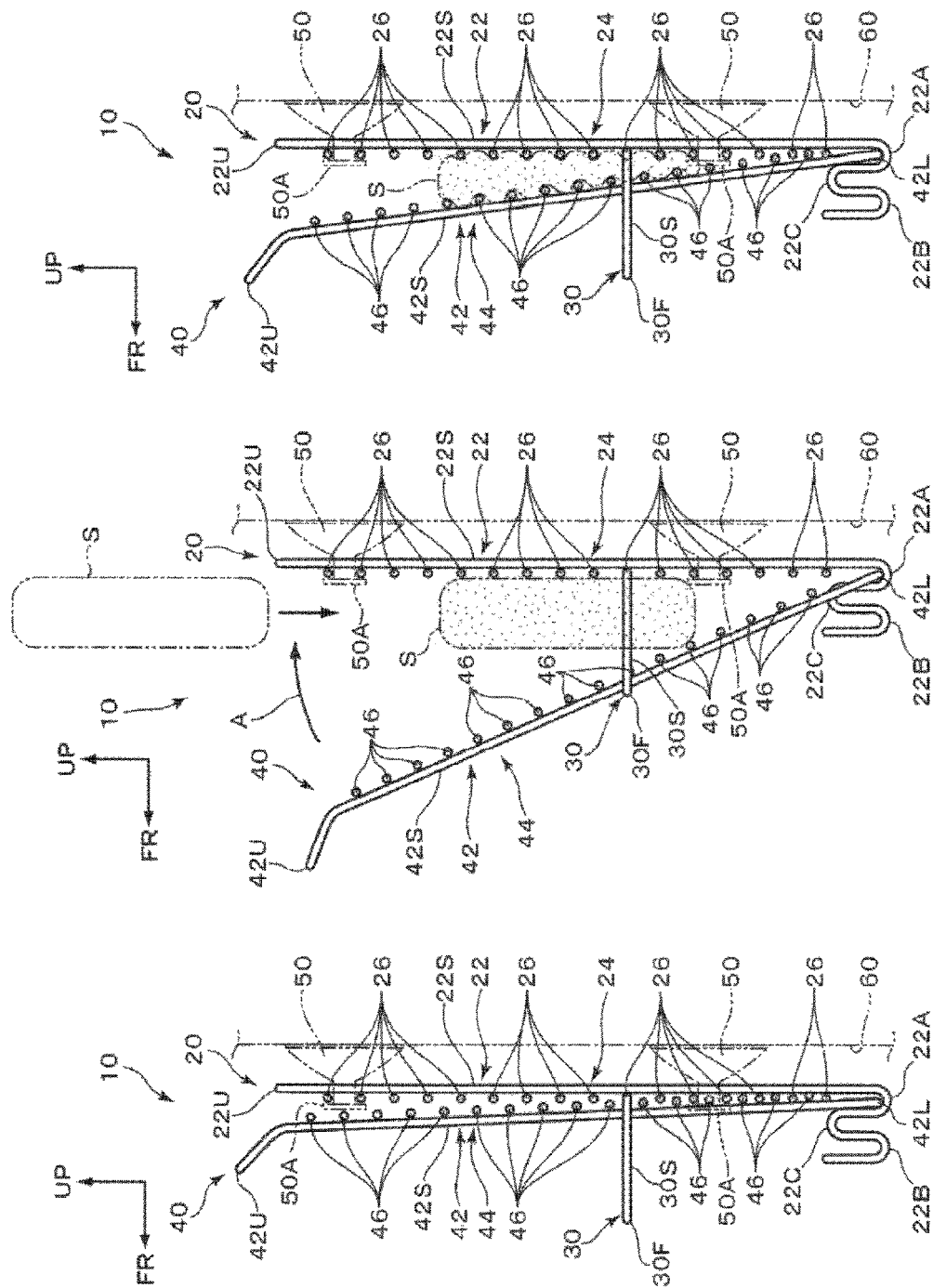

DRAINING RACK FOR CLEANING SPONGE

BACKGROUND OF THE INVENTION

1. Field of the Invention

The present invention relates to a draining rack for a cleaning sponge.

2. Description of the Related Art

In Patent document 1 listed below, a draining rack has been disclosed, configured to allow a cleaning sponge to be mounted at an inclination such that a corner thereof becomes a lower end thereof. With such a draining rack, by maintaining such a cleaning sponge in the draining rack after it is used, this arrangement allows water remaining in the cleaning sponge to be discharged via the corner that corresponds to the lower end, thereby draining the cleaning sponge.

RELATED ART DOCUMENTS

Patent Documents

[Patent Document 1]
Japanese Patent Application Laid-Open No. 2012-228386

However, with the aforementioned draining rack, the user mounts the cleaning sponge in the draining rack without squeezing the cleaning sponge after it is used. Accordingly, such an arrangement requires a predetermined draining time (time required to remove a predetermined amount of water from the cleaning sponge). Thus, there is room for further improvement from the viewpoint of reducing the draining time.

One or more embodiments of the present invention provide a draining rack for a cleaning sponge with reduced draining time.

SUMMARY OF THE INVENTION

At least one embodiment of the present invention proposes a draining rack for a cleaning sponge. The draining rack comprises: a fixed rack to be mounted on an attachment target portion via another member; and a movable rack arranged on a front side of the fixed rack, and configured to hold the cleaning sponge, jointly with the fixed rack. The movable rack is supported by the fixed rack such that the movable rack can be rotated between an upright position at which the movable rack stands upright on the front side of the fixed rack and a tilted position at which the movable rack is tilted toward the front side from the upright position.

At least one embodiment of the present invention also proposes the draining rack for a cleaning sponge. Multiple support, portions are formed on the fixed rack, each configured to support a lower-end portion of the movable rack. The support portions are arranged in parallel in a front-back direction.

At least one embodiment of the present invention also proposes the draining rack for a cleaning sponge. The fixed rack comprises a stopper member configured to have a frame structure as viewed in a planar view, such that the movable rack is arranged in an opening defined by the stopper member. By configuring the movable rack such that it comes in contact with the stopper member at the tilted position, the movable rack is supported at the tilted position.

At least one embodiment of the present invention also proposes the draining rack for a cleaning sponge. The fixed rack comprises: a fixed-side frame portion that forms an outer circumferential portion of the fixed rack; and multiple fixed-side horizontal rods each configured such that it extends in a left-right direction, and each configured to have both end portions in a longitudinal direction thereof fixed to the fixed-side frame portion. The movable rack comprises: a movable-side frame portion that forms an outer circumferential portion of the movable rack; and multiple movable-side horizontal rods each configured such that it extends in a left-right direction, and each configured to have both end portions in a longitudinal direction thereof fixed to the movable-side frame portion.

At least one embodiment of the present invention also proposes the draining rack for a cleaning sponge. When the draining rack is set to the upright position, the fixed-side horizontal rods are arranged on a front side with respect to the fixed-side frame portion, the movable-side horizontal rods are arranged on a rear side with respect to the movable-side frame portion, and the fixed-side horizontal rods and the movable-side horizontal rods are alternately arranged in an upper-lower direction as viewed from a side view.

At least one embodiment of the present invention also proposes the draining rack for a cleaning sponge. The fixed-side frame portion is designed to have a wire diameter that is greater than those of the fixed-side horizontal rods. The movable-side frame portion is designed to have a wire diameter that is greater than those of the movable-side horizontal rods.

With at least one embodiment of the present invention, this arrangement allows time required for draining to be reduced.

BRIEF DESCRIPTION OF THE DRAWINGS

FIG. 2A is a side view showing the cleaning sponge draining rack in a state in which the movable rack shown in FIG. 1 is arranged at the upright position, FIG. 2B is a side view showing a state in which the movable rack shown in FIG. 2A is set to the tilted position, and the cleaning sponge is held between the fixed rack and the movable rack, and FIG. 2C is a side view showing a state in which the movable rack is rotated to the upright position side from the state shown in FIG. 2B so as to squeeze the cleaning sponge.

DESCRIPTION OF THE PREFERRED EMBODIMENTS

Figure 1:
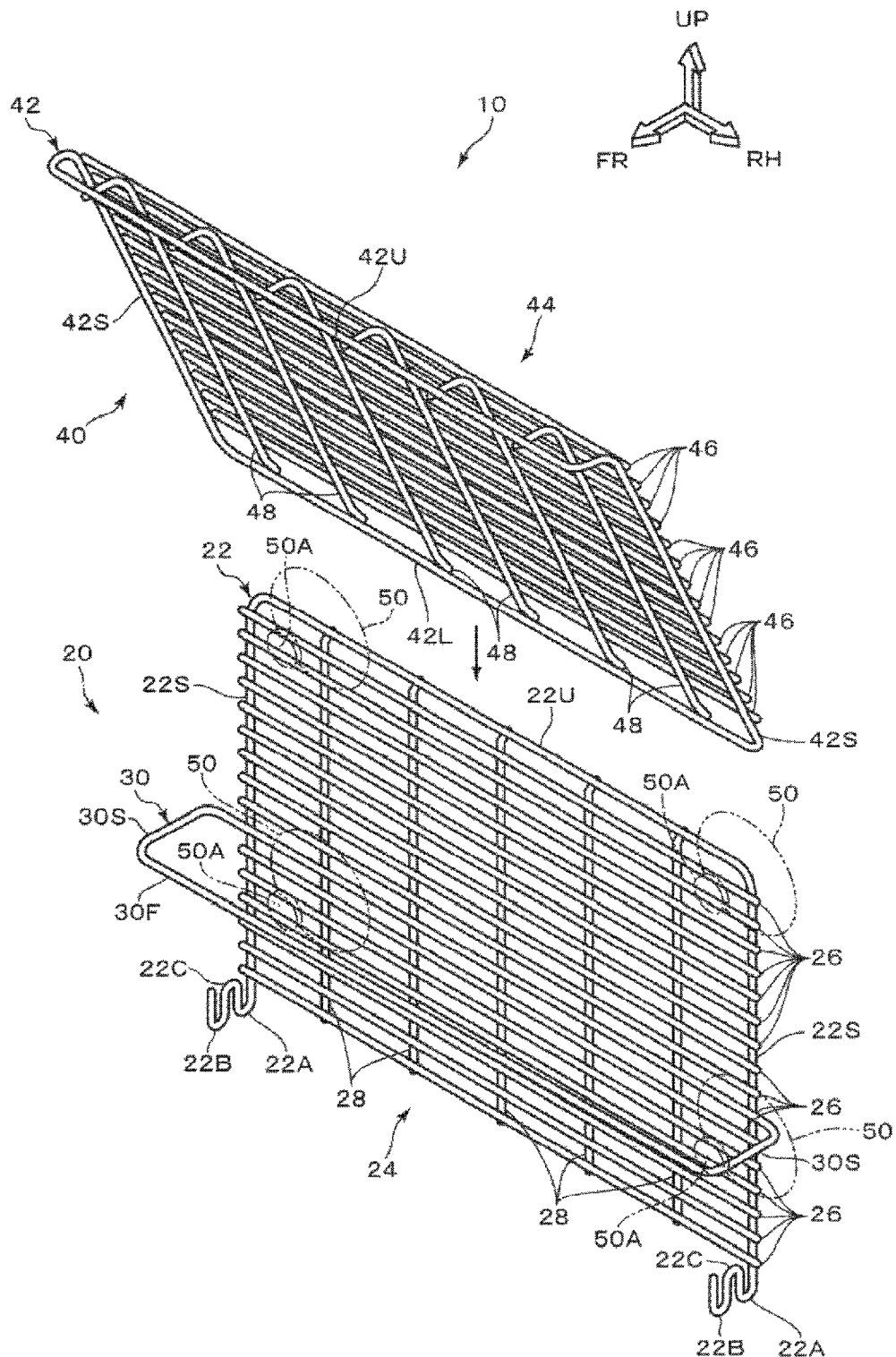
FIG. 1 is an exploded perspective view showing a draining rack for a cleaning sponge according to the present embodiment.

Description will be made below with reference to the drawings regarding a draining rack 10 for a cleaning sponge (which will simply be referred to as the "draining rack 10" hereafter) according to the present embodiment. It should be noted that the arrows UP, FR, and RB shown in the drawings as appropriate represent the upper side, the front side, and the right side (one side in the width direction), respectively, of the draining rack 10. The directions used in the following description, i.e., the upper-lower direction, the front-back direction, and the left-right, direction, represent the upper and lower, front and back, and left and right directions of the draining rack 10, unless otherwise noted.

As shown in FIG. 1, the draining rack 10 is configured including a fixed rack 10 and a movable rack 40. The draining rack 10 is configured to hold a cleaning sponge S (see FIG. 2B) such that it is interposed between the fixed rack 20 and the movable rack 40 in the front-back direction. Description will be made below regarding each component of the draining rack 10.

[Regarding the Fixed Rack 20]

The fixed rack 20 is configured including a fixed-side frame 22 configured as a "fixed-side frame portion" that forms an outer circumferential portion of the fixed rack 20, and a fixed-side draining portion 24 fixedly mounted on the fixed-side frame 22.

The fixed-side frame 22 is configured of a member such as a wire having an approximately rod-like shape, and configured to have an approximately inverted-U-shaped structure having an opening that faces the lower side in a front view as viewed from the front direction. Specifically, the fixed-side frame 22 is configured including an upper-frame portion 22U configured as an upper-end portion of the fixed-side frame 22, and configured such that it extends in the left-right direction, and a pair of side frame portions 22S each configured such that it extends toward the lower side from the corresponding one of both ends of the upper-frame portion 22U along the longitudinal direction. Furthermore, the fixed-side frame 22 (i.e., the fixed rack 20) is configured such that the length thereof in the left-right direction is larger than that in the upper-lower direction.

Furthermore, a first support portion 22A is monolithically formed with each of the lower-end portions of the pair of side frame portions 22S. This provides a "support portion" configured to support the movable rack 40 such that it can be tilted (rotated) as described later. The first support portion 22A is configured to have an approximately U-shaped structure having an opening that faces the upper side as viewed from the side direction. Furthermore, the first support portion 22A is configured such that its front side protrudes toward the front side with respect to the side frame portion 22S. In addition, a second support portion 22B is monolithically formed with each of the lower-end portions of the pair of side frame portions 22S. This also provides a "support portion" configured to support the movable rack 40 such that it can be titled as described later. The second support portion 22B configured to have an approximately U-shaped structure having an opening that faces the upper side as viewed from the side direction. The front-side upper-end portion of the first support portion 22A is coupled with the rear side of the upper-end portion of the second support portion 22B via a coupling portion 22C. The coupling portion 22C is configured to have an approximately semi-circular shape having an opening that faces the lower side as viewed from the side direction.

The fixed-side draining portion 24 is configured of members such as multiple wires each having an approximately rod-like shape. Furthermore, the fixed-side draining portion 24 is configured to have a grid structure (net-like structure) using such members. Specifically, the fixed-side draining portion 24 is configured including multiple fixed-side draining horizontal rods 26 configured as multiple "fixed-side horizontal rods" each configured such that it extends in the left-right direction, and multiple fixed-side draining vertical rods 28 each configured such that it extends in the upper-lower direction (which are elements each of which can be broadly regarded as a "fixed-side vertical rod").

The multiple fixed-side draining horizontal rods 26 are arranged side-by-side on the front side of the fixed-side frame 22 at predetermined intervals along the upper-lower direction such that they adjoin the fixed-side frame 22. Furthermore, both ends of each fixed-side draining horizontal rod 26 along the longitudinal direction are fixedly supported by the side frame portion 22S of the fixed-side frame 22 by welding or the like.

The multiple fixed-side draining vertical rods 28 are arranged side-by-side at predetermined intervals along the left-right direction on the rear side of the fixed-side draining horizontal rods 26 such that they adjoin the fixed-side draining horizontal rods 26. Furthermore, the upper-end portion of each fixed-side draining vertical rod 28 is formed such that it is curved and tilted toward the rear side as it becomes closer to the upper side, and is fixed to the upper-frame portion 22U of the fixed-side frame 22 by welding or the like. On the other hand, the lower-end portion of each fixed-side draining vertical rod 28 is fixed to a particular fixed-side draining horizontal rod 26 arranged on the lowest side from among the multiple fixed-side draining horizontal rods 26 by welding or the like. Furthermore, each fixed-side draining vertical rod 28 is fixed by welding or the like to a portion where it crosses a fixed-side draining horizontal rod 26.

The fixed-side draining horizontal rods 26 and the fixed-side draining vertical rods 28 are each designed to have the same wire diameter (diameter). The aforementioned fixed-side frame 22 is designed to have a wire diameter (diameter) that is grater than those of the fixed-side draining horizontal rods 26 and the fixed-side draining vertical rods 28.

Furthermore, the fixed rack 20 includes a stopper member 30 having an approximately rectangular frame shape in a planar view as viewed from the upper side. The rear-end portion of the stopper member 30 is configured as a lower one of the multiple fixed-side draining horizontal rods 26. Specifically, the stopper member 30 is configured including a pair of side-stopper portions 30S each configured such that it extends toward the front side from the corresponding one of both ends of the fixed-side draining horizontal rod 26 that forms the stopper member 30 in the longitudinal direction, and a front stopper portion 30F configured to couple the front-end portions of the pair of side-stopper portions 30S and configured such that it extends in the left-right direction. Furthermore, the stopper member 30 is designed to have a width that is greater than that of the fixed-side frame 22. The side-stopper portions 30S are arranged at positions outside the fixed-side frame 22 in the width direction. That is to say, the fixed-side draining horizontal rod 26 that forms the stopper member 30 is designed to have a longitudinal length that is greater than that of the other fixed-side draining horizontal rods 26.

Furthermore, a pair of suction cups 50 (that correspond to "another member" in the present invention) arranged in the left-right direction, i.e., a left suction cup and a right suction cup, are mounted on each of an upper portion and a lower portion of the fixed-side draining portion 24. That is to say, in the present embodiment, four suction cups 50 are mounted on the fixed-side draining portion 24. Specifically, an attachment 50A of each suction cup 50 is arranged between the corresponding fixed-side draining horizontal rods 26 arranged adjacent to each other in the upper-lower direction. Accordingly, the suction cup 50 is arranged such that it protrudes toward the rear side with respect to the fixed-side draining portion 24. With such an arrangement, by attaching the suction cup 50 to an attachment target portion 60 (see FIG. 2) of a sink in a kitchen or the like, this arrangement allows the fixed rack 20 to be mounted on the attachment target portion 60 by means of the suction cups 50.

[Regarding the Movable Rack 40]

The movable rack 40 is arranged on the front side of the fixed-side draining portion 24 of the fixed rack 20 (see FIG. 2). The movable rack 40 is configured including a movable-side frame 42 configured as a "movable-side frame portion" that forms an outer circumferential portion of the movable rack 40, and a movable-side draining portion 44 fixed to the movable-side frame 42.

The movable-side frame 42 is configured of a member such as a wire having an approximately rod-like shape, and is configured in an approximately rectangular frame shape in a front view. Specifically, the movable-side frame 42 is configured including an upper-frame portion 42U configured as an upper-end portion of the movable-side frame 42 and configured such that it extends in the left-right direction, a pair of side frame portions 42S configured such that they respectively extend toward the lower side from both ends of the upper-frame portion 42U along the longitudinal direction, and a lower-frame portion 42L that couples the lower-end portions of the pair of side frame portions 42S and configured such that it extends in the left-right direction. Furthermore, the upper-end portions of the pair of side frame portions 42S are configured such that they are curved and tilted toward the front side as it becomes closer to the upper side. The upper-frame portion 42U is arranged more toward the front side than the lower-frame portion 42L.

Furthermore, the movable-side frame 42 is designed to have a width that is greater than that of the fixed rack 20 (i.e., the fixed-side frame 22 of the fixed rack 20). Moreover, the movable-side frame 42 is designed to have a width that is smaller than that of the stopper member 30 of the fixed rack 20. With such an arrangement, the movable-side frame 42 (movable rack 40) is inserted from the upper side into the stopper member 30 (see the arrows shown in FIG. 1). Furthermore, the lower-frame portion 42L of the movable-side frame 42 is inserted from the upper side into the first support portion 22A or otherwise the second support portion 22B. As shown in FIG. 2A, this allows the lower-frame portion 42L to be supported from the lower side by means of the bottom of the first support portion 22A or otherwise the bottom of the second support portion 22B (FIG. 2A shows an example in which the lower-frame portion 42L is supported by the bottom of the first support portion 22A). In this state, the movable-side frame 42 (movable rack 40) is supported such that it can be tilted (rotated) around the axis of the lower-frame portion 42L.

Specifically, the movable-side frame 42 (movable rack 40) is configured such that it can be tilted (rotated) between the upright position (position shown in FIG. 2A) at which it stands upright on the front side of the fixed rack 20 and a tilted position (position shown in FIG. 2B) at which it is tilted toward the front side around the axis of the lower-frame portion 42L with respect to the upright position. With such an arrangement, in a state in which the movable-side frame 42 (movable rack 40) is set to the tilted position as shown in FIG. 2B, the movable-side frame 42 is in contact with the front stopper portion 30F of the stopper member 30, which restricts the tilting of the movable rack 40 toward the front side from the tilted position. It should be noted that the movable rack 40 is configured such that, in a state in which the movable rack 40 is supported by the fixed rack 20 such that it can be tilted (rotated), a slight gap is defined between the movable-side frame 42 and the side-stopper portion 30S in the left-right direction. This arrangement allows the movable rack 40 to be tilted (rotated). The movement of the movable rack 40 in the left-right direction is restricted by the side-stopper portion 30S as the movable-side frame 42 comes in contact with the side-stopper portion 30S. This arrangement prevents the movable rack 40 from falling out of the fixed rack 20.

As shown in FIG. 1, as with the fixed-side draining portion 24, the movable-side draining portion 44 is configured of members such as multiple wires each having an approximately rod-like shape, and is configured to have a grid structure (net-like structure) using such members. Specifically, the movable-side draining portion 44 is configured including multiple movable-side draining horizontal rods 46 configured as multiple "movable-side horizontal rods" each configured such that it extends in the left-right direction, and multiple movable-side draining vertical rods 48 (which are elements each of which can be broadly regarded as a "movable-side vertical rod") each configured such that it extends along the longitudinal direction of the side frame portion 42S of the movable-side frame 42.

The multiple movable-side draining horizontal rods 46 are arranged side-by-side on the rear side of the movable-side frame 42 at predetermined intervals along the upper-lower direction such that they adjoin the movable-side frame 42. Furthermore, both ends of each movable-side draining horizontal rod 46 along the longitudinal direction are fixedly supported by the side frame portion 42S of the movable-side frame 42 by welding or the like.

The multiple movable-side draining vertical rods 48 are arranged side-by-side at predetermined intervals along the left-right direction on the front side of the movable-side draining horizontal rods 46 such that they adjoin the movable-side draining horizontal rods 46. Furthermore, the upper-end portion of each movable-side draining vertical rod 48 is formed such that it is curved and tilted toward the front side as it becomes closer to the upper side as viewed from a side view according to the upper-end portion of the side frame portion 42S, and is fixed to the upper-frame portion 42U of the movable-side frame 42 by welding or the like. On the other hand, the lower-end portion of each movable-side draining vertical rod 48 is fixed to the lowest-side movable-side draining horizontal rod 46 from among the multiple movable-side draining horizontal rods 46 by welding or the like. Furthermore, each movable-side draining vertical rod 48 is fixed by welding or the like to each portion where it crosses one of the multiple movable-side draining horizontal rods 46.

The movable-side draining horizontal rods 46 and the movable-side draining vertical rods 48 are each designed to have the same wire diameter (diameter). The aforementioned movable-side frame 42 is designed to have a wire diameter (diameter) that is grater than those of the movable-side draining horizontal rods 46 and the movable-side draining vertical rods 48. Furthermore, in the present embodiment, the movable-side frame 42 and the fixed-side frame 22 are each designed to have the same wire diameter. Moreover, the movable-side draining horizontal rods 46, the movable-side draining vertical rods 48, the fixed-side draining horizontal rods 26, and the fixed-side draining vertical rods 28 are each designed to have the same wire diameter.

Furthermore, in a state in which the movable rack 40 is set to the upright position, the layout of the movable-side draining horizontal rods 46 with respect to the movable-side frame 42 and the layout of the fixed-side draining horizontal rods 26 with respect to the fixed-side frame 22 are designed such that the movable-side draining horizontal rods 46 of the movable rack 40 and the fixed-side draining horizontal rods 26 of the fixed rack 20 are alternately arranged in the upper-lower direction (see FIG. 2B).

[Regarding Actions and Effects]

Next, description will be made regarding the actions and effects of the present embodiment.

The draining rack 10 having the aforementioned configuration includes the fixed rack 20. The fixed rack 20 is attached to the attachment target portion 60 via the suction cups 50. Furthermore, the draining rack 10 includes the movable rack 40. The lower-frame portion 42L of the movable rack 40 is supported by the first support portion 22A of the fixed rack 20. In this state, the movable rack 40 is supported by the fixed rack 20 such that it can be tilted (rotated).

With such an arrangement, as shown in FIG. 2B, when a cleaning sponge S is to be drained by means of the draining rack 10, the movable rack 40 of the draining rack 10 is set to the tilted position at which the movable rack 40 has an orientation in which it is tilted toward the front side with respect to the fixed rack 20. In this state, an approximately V-shaped space having an opening that faces the upper side as viewed from the side direction is defined between the fixed rack 20 and the movable rack 40.

Subsequently, the cleaning sponge S is inserted from the upper side into the space defined between the fixed rack 20 and the movable rack 40. Accordingly, the lower-end portion of the cleaning sponge S is interposed between the fixed rack 20 (the fixed-side draining portion 24 thereof) and the movable rack 40 (the movable-side draining portion 44 thereof) in the front-back direction. In this state, the cleaning sponge S is held by the fixed-side draining portion 24 and the movable-side draining portion 44.

In this state, the user holds the upper-frame portion 42U of the movable-side frame 42 of the movable rack 40, and rotates the movable rack 40 from the tilted position to the upright position side (the side and direction indicated by the arrow A shown in FIG. 2B). As shown in FIG. 2C, the cleaning sponge S is pressed (squeezed) in the front-back direction by means of the fixed rack 20 (the fixed-side draining portion 24 thereof) and the movable rack 40 (the movable-side draining portion 44). This provides the cleaning sponge S with compressive deformation (elastic deformation). As a result, a liquid such as water or the like remaining in the cleaning sponge S is removed from the cleaning sponge S. The liquid is discharged such that it flows from the draining rack 10 toward the lower side.

Subsequently, the rotation of the movable rack 40 from the tilted position to the upright position side is repeatedly performed multiple times, following which the movable rack 40 is set to the tilted position. As a result, the cleaning sponge S after the squeezing is held by the movable rack 40 and the fixed rack 20. With such an arrangement, the cleaning sponge S after the squeezing is left in a state in which it is maintained in the draining rack 10, thereby draining the cleaning sponge S.

As described above, the draining rack 10 according to the present embodiment is configured including the fixed rack 20 and the movable rack 40 supported by the fixed rack 20 such that it can be tilted. The movable rack 40 is supported by the fixed rack 20 such that it can be tilted (rotated) between the upright position at which the movable rack 40 stands upright on the front side of the fixed, rack 20 and the tilted position at which, the movable rack 40 is tilted toward the front side from the upright position. As described above, by rotating the movable rack 40 from the tilted position to the upright position in a state in which the cleaning sponge S is held (interposed) between the fixed rack 20 and the movable rack 40, this arrangement allows the draining rack 10 to squeeze the cleaning sponge S, and allows the draining rack 10 to drain the cleaning sponge S after it is squeezed. That is to say, the draining rack 10 has two functions, i.e., a function of squeezing the cleaning sponge S and a function of draining the cleaning sponge S after it has been squeezed. Accordingly, this arrangement requires only a short period of time to drain the cleaning sponge S as compared with a case in which the cleaning sponge S is drained using a draining rack, including no function of squeezing the cleaning sponge S (a case in which the cleaning sponge S is maintained in the draining rack without squeezing the cleaning sponge S).

Furthermore, with the draining rack 10 according to the present embodiment, this allows the user to squeeze the cleaning sponge S by means of the draining rack 10 without the user's hand touching the cleaning sponge S. Thus, for a user who does not want to squeeze the cleaning sponge S by hand, this arrangement provides improved convenience.

Furthermore, with the draining rack 10 according to the present embodiment, in a case in which the cleaning sponge S is to be sterilized by a sterilization agent, for example, this arrangement allows the user to sterilize the cleaning sponge S while protecting the user's hands from adhesion of the sterilization agent.

That is to say, in a case in which the cleaning sponge S is sterilized using a sterilization agent, in order to distribute the sterilization agent over the entire region of the cleaning sponge S, a method is known in which, after the sterilization agent is applied to the cleaning sponge S, the cleaning sponge S is squeezed, following which the cleaning sponge S is maintained at a predetermined location, thereby sterilizing the cleaning sponge S. With such a method, if the user squeezes the cleaning sponge S by hand after the sterilization agent is applied to the cleaning sponge S, the sterilization agent adheres to the user's hand. Accordingly, in order to remove the sterilization agent that has adhered to the user's hand, the user must wash his or her hands. This involves a troublesome operation by the user in the sterilization.

In contrast, in a case in which the cleaning sponge S is sterilized using the draining rack 10 according to the present embodiment, sterilization agent is applied to the cleaning sponge S in a state in which the cleaning sponge S is held (interposed) between the fixed rack 20 and the movable rack 40. After the sterilization agent is applied to the cleaning sponge S, the movable rack 40 is rotated from the tilted position to the upright position side, thereby squeezing the cleaning sponge S. As a result, the sterilization agent is evenly distributed over the entire region of the cleaning sponge S. In this state, the cleaning sponge S is maintained between the movable rack 40 and the fixed rack 20 of the draining rack 10, thereby sterilizing the cleaning sponge S.

With the draining rack 10 according to the present embodiment, when the sterilization agent is to be evenly distributed over the entire region of the cleaning sponge S, the cleaning sponge S is squeezed by the movable rack 40 and the fixed rack 20. This protects the user's hands from adhesion of the sterilization agent. Accordingly, this arrangement allows the cleaning sponge S to be sterilized while protecting the user's hands from adhesion of the sterilization agent.

Furthermore, the lower-end portion of the fixed rack 20 included in the draining rack 10 is provided with the first support portion 22A and the second support, portion 22B each configured to support the lower-frame portion 42L of the movable rack 40 such that it can be tilted (rotated). The second support portion 22B is arranged on the front side of the first support portion 22A. That is to say, the first support portion 22A and the second support portion 22B are arranged side-by-side in the front-back direction. Accordingly, when the lower-frame portion 42L is supported by the second support portion 22B, the movable rack 40 is arranged at a position that is closer to the front side with respect to the fixed rack 20 than a case in which the lower-frame portion 42L is supported by the first support portion 22A. This allows a space defined between the fixed rack 20 and the movable rack 40 to be increased in the front-back direction. As a result, by supporting the lower-frame portion 42L by the second support portion 22B, for example, this allows the draining rack 10 to drain the cleaning sponge S even if the cleaning sponge S has a relatively large thickness. Accordingly, the draining rack 10 enables support for draining various different thicknesses of the cleaning sponge S.

Furthermore, the fixed rack 20 is provided with the stopper member 30 having a rectangular frame structure. As the movable rack 40 comes in contact with the front stopper portion 30F of the stopper member 30 when the movable rack 40 is set to the tilted position, this arrangement restricts the tilting of the movable rack 40 toward the front side. Moreover, as the movable rack 40 comes in contact with the pair of side-stopper portions 30S of the stopper member 30, this arrangement restricts the movement of the movable rack 40 in the left-right direction. This allows the movable rack 40 to be held at the tilted position by means of such a simple configuration. Furthermore, this arrangement is capable of preventing the movable rack 40 from falling out of the fixed rack 20.

Furthermore, the fixed rack 20 is configured including the fixed-side frame 22 and multiple fixed-side draining horizontal rods 26 supported by the fixed-side frame 22 and arranged such that they extend in the left-right direction. The movable rack 40 is configured including the movable-side frame 42 and multiple movable-side draining horizontal rods 46 supported by the movable-side frame 42 and arranged such that they extend in the left-right direction. This allows the weight of the draining rack 10 to be reduced as compared with a case in which the fixed rack 20 and the movable rack 40 are each configured of a sheet-shaped (plate-shaped) member.

Furthermore, when the movable rack 40 is set to the upright position, the fixed-side draining horizontal rods 26 of the fixed rack 20 and the movable-side draining horizontal rods 46 of the movable rack 40 are alternately arranged in the upper-lower direction. With this arrangement, when the movable rack 40 is rotated from the tilted position to the upright position side, the cleaning sponge S is pressed and squeezed in the front-back direction by the fixed-side draining horizontal rods 26 and the movable-side draining horizontal rods 46 thus alternately arranged in the upper-lower direction. This allows the cleaning sponge S to be squeezed by the fixed-side draining horizontal rods 26 and the movable-side draining horizontal rods 46 at relatively narrow intervals in the upper-lower direction. This allows the cleaning sponge S to be squeezed with high efficiency by means of the fixed-side draining horizontal rods 26 and the movable-side draining horizontal rods 46.

Furthermore, in the fixed rack 20, the fixed-side frame 22 is designed to have a wire diameter that is greater than those of the fixed-side draining horizontal rods 26 and the fixed-side draining vertical rods 28 that form the fixed-side draining portion 24. This allows the fixed-side frame 22 that supports the fixed-side draining portion 24 to have increased strength. Moreover, in the movable rack 40, the movable-side frame 42 is designed to have a wire diameter that is greater than those of the movable-side draining horizontal rods 46 and the movable-side draining vertical rods 48 that form the movable-side draining portion 44. This allows the movable-side frame 42 that supports the movable-side draining portion 44 to have increased strength. As a result, when the cleaning sponge S is squeezed by means of the draining rack 10 by rotating the movable rack 40 from the tilted position to the upright position side, this arrangement prevents deformation of the fixed rack 20 and the movable rack 40. Accordingly, this allows the draining rack 10 to squeeze the cleaning sponge S with high efficiency.

Furthermore, in the draining rack 10, the attachment 50A of each suction cup 50 is arranged between the fixed-side draining horizontal rods 26 that are adjacent in the upper-lower direction. Accordingly, the draining rack 10 can be mounted on the attachment target portion 60 while adjusting the position of each suction cup 50 in the width direction (left-right direction) of the draining rack 10 (fixed rack 20) with respect to the fixed rack 20. When the attachment target portion 60 is to be set to a corner of a sink or the like, for example, by adjusting the position of each suction cup 50 in the width direction (left-right direction) of the fixed rack 20 with respect to the fixed rack 20, this arrangement allows the draining rack 10 to be mounted on such a corner of a sink or the like.

Figure 3A:
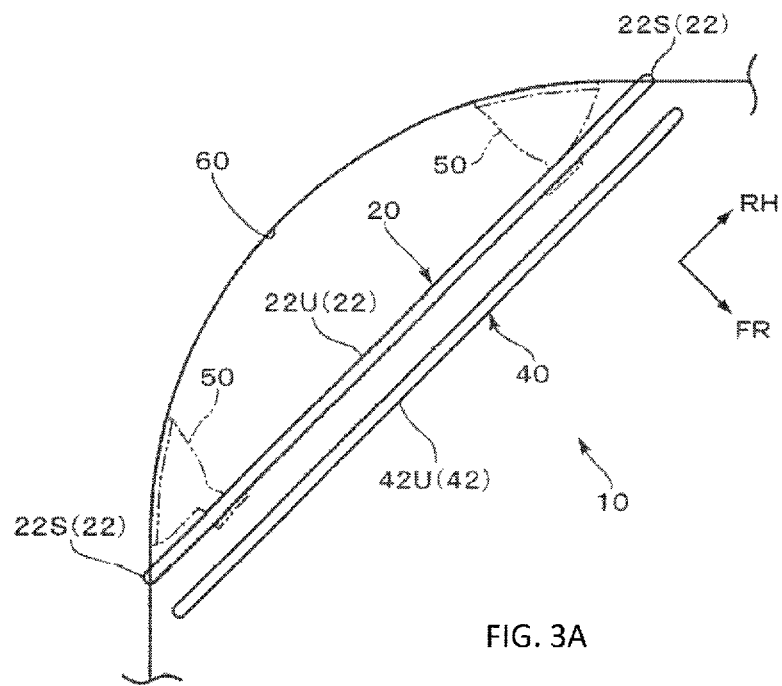
FIG. 3A is a schematic plan view showing an interference state between the side frame portion and the attachment target portion in a case in which the attachment target portion is set to a corner of a sink or the like, and FIG. 3B is a schematic plan view showing a state in which the position of each suction cup is adjusted in the width direction of the draining rack from the state shown in FIG. 3A, so as to avoid the interference state between the side frame portion and the attachment target portion.

That is to say, as shown in FIG. 3A, when the draining rack 10 is to be mounted on a corner of a sink or the like, in some cases, the side frame portion 22S of the fixed rack 20 comes in contact with the side face (attachment target portion 60) of the sink or the like. In a case in which the fixed rack 20 is mounted on such a corner of a sink or the like via the suction cups 50, this arrangement has the potential to involve a problem in that such a suction cup 50 readily separates from a corner of a sink or the like.

Figure 3B:
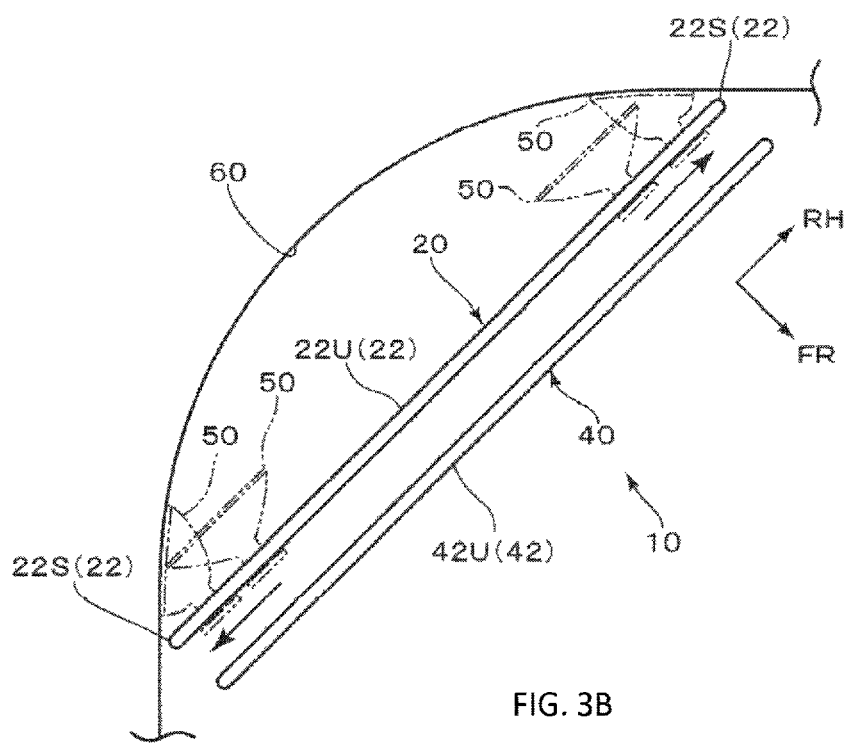

In order to solve such a problem, as shown in FIG. 3B, by shifting each suction cup 50 outward in the width direction of the fixed rack 20 (see arrows in FIG. 3B), this arrangement allows the distance between the fixed rack 20 and the side face (attachment target portion 60) of the sink or the like to be increased. Accordingly, this arrangement allows each suction cup 50 to be arranged between the attachment target portion 60 and the side frame portion 22S. This allows the draining rack 10 to be mounted on a corner of a sink or the like while suppressing interference between the side frame portion 22 and the sink. Accordingly, this arrangement allows the draining rack 10 to be effectively mounted on such a corner of a sink or the like.

It should be noted that description has been made in the present embodiment regarding an arrangement in which the fixed-side draining horizontal rods 26 of the fixed rack 20 are arranged on the front side of the fixed-side frame 22 such that they adjoin the fixed-side frame 22. On the other hand, the movable-side draining horizontal rods 46 of the movable rack 40 are arranged on the rear side of the movable-side frame 42 such that they adjoin the movable-side frame 42. Instead of such an arrangement, the fixed-side draining horizontal rods 26 may be arranged on the rear side of the fixed-side frame 22 such that they adjoin the fixed-side frame 22. Also, the movable-side draining horizontal rods 46 may be arranged on the front side of the movable-side frame 42 such that they adjoin the movable-side frame 42.

Description has been made in the present embodiment regarding an arrangement in which, when the movable rack 40 is set to the upright position, the fixed-side draining horizontal rods 26 of the fixed rack 20 and the movable-side draining horizontal rods 46 of the movable rack 40 are alternately positioned in the upper-lower direction. Also, the positions of the fixed-side draining horizontal rods 26 in the upper-lower direction and the positions of the movable-side draining horizontal rods 46 in the upper-lower direction may be changed as desired. For example, the layout may be designed such that, when the movable rack 40 is set to the upright position, the positions of the movable-side draining horizontal rods 46 in the upper-lower direction match the positions of the fixed-side draining horizontal rods 26 in the upper-lower direction.

Description has been made in the present embodiment regarding an arrangement in which the fixed-side frame 22 is designed to have a wire diameter that is greater than those of the fixed-side draining horizontal rods 26 and the fixed-side draining vertical rods 28. However, the fixed-side draining horizontal rods 26 and the fixed-side draining vertical rods 28 may each be designed to have a desired wire diameter. For example, the fixed-side draining horizontal rods 26 and the fixed-side draining vertical rods 28 may each be designed to have the same wire diameter as that of the fixed-side frame 22. Also, in the same manner, the movable-side draining horizontal rods 46 and the movable-side draining vertical rods 48 may each be designed to have the same wire diameter as that of the movable-side frame 42.

Description has been made in the present embodiment regarding an arrangement in which the fixed rack 20 has two support portions (the first support portion 22A and the second support portion 22B) each configured to support the movable rack 40. Also, in the fixed rack 20, the second support portion 22B may be omitted. That is to say, the fixed rack 20 may be configured to have only a single support portion configured to support the movable rack 40. Also, the fixed rack 20 may be provided with three or more support portions each configured to support the movable rack 40. Such support portions may be arranged side-by-side in the front-back direction.

Description has been made in the present embodiment regarding an arrangement in which the fixed-side draining portion 24 of the fixed rack 20 and the movable-side draining portion 44 of the movable rack 40 are each configured to have a grid structure (net-like structure). However, the fixed-side draining portion 24 and the movable-side draining portion 44 are not restricted to such a structure. For example, the fixed-side draining portion 24 and the movable-side draining portion 44 may each be configured to have an approximately rectangular plate-like shape. Furthermore, multiple draining openings may be formed in the fixed-side draining portion 24 and the movable-side draining portion 44 each having a plate-like shape.

Description has been made in the present embodiment regarding an arrangement in which the fixed rack 20 is designed to have a width dimension that is greater than the dimension in the upper-lower direction (i.e., the draining rack 10 has a horizontally long structure). Instead of such an arrangement, the fixed rack 20 may be designed to have a width dimension that is smaller than the dimension in the upper-lower direction, i.e., may be designed to have a vertically long structure. This arrangement allows the draining rack 10 to be mounted such that it matches a corner of a sink or the like even in a case in which the corner has a relatively small radius when the draining rack 10 is to be mounted on such a corner of the sink or the like as shown in FIG. 3B.

DESCRIPTION OF THE REFERENCE NUMERALS

10 draining rack for cleaning sponge, 20 fixed rack, 22 fixed-side frame (fixed-side frame portion), 22U upper frame portion, 22S side frame portion, 22A first support portion (support portion), 22B second support portion (support portion), 22C coupling portion, 24 fixed-side draining portion, 26 fixed-side draining horizontal rod (fixed-side horizontal rod), 28 fixed-side draining vertical rod, 30 stopper member, 30S side stopper portion, 30F front stopper portion, 40 movable rack, 42 movable-side frame (movable-side frame portion), 42U upper frame portion, 42S side frame portion, 42L lower frame portion, 44 movable-side draining portion, 46 movable-side draining horizontal rod (movable-side horizontal rod), 48 movable-side draining vertical rod, 50 suction cup (another member), 50A attachment, 60 attachment target portion, S cleaning sponge.

What is claimed is:

1. A draining rack for a cleaning sponge, comprising:
    a fixed rack configured to be mounted on a wall;
    a movable rack arranged on a front side of the fixed rack, wherein the movable rack is configured to hold the cleaning sponge jointly with the fixed rack;
    a fixed-side frame portion that forms an outer portion of the fixed rack; and
    a plurality of fixed-side horizontal rods each having end portions fixed to the fixed-side frame portion,
    wherein the fixed-side frame portion comprises:
        a pair of side frame portions extending in a longitudinal direction; and
        a support extending from a lower end of each of the side frame portions on the front side of the fixed rack,
    wherein the support comprises:
        a first support portion defining a generally U-shape that opens upward;
        a second support portion defining a generally U-shape that opens upward; and
        a coupling portion having a generally semi-circular shape that opens downward wherein the coupling portion is between the first support portion and the second support portion;
    wherein the first support portion and the second support portion are coupled with the coupling portion; and the first support portion and the second support portion are configured to selectively receive the lower-end portion of the movable rack to attach the movable rack to the fixed rack at different locations and accommodate the sponge or other sponges having various sizes,
    wherein the movable rack comprises:
        a movable-side frame portion that forms an outer portion of the movable rack; and
        a plurality of movable-side horizontal rods each having end portions fixed to the movable-side frame portion;
    wherein the movable rack is supported by the fixed rack such that the movable rack can be rotated between an upright position at which the movable rack stands upright on the front side of the fixed rack and a tilted position at which the movable rack is tilted forwardly from the upright position, wherein the cleaning sponge is configured to inserted between the fixed rack and the movable rack when the movable rack is in the tilted position, wherein the cleaning sponge is configured to be squeezed and drained when the movable rack is in the upright position;
    wherein the fixed rack comprises a plurality of fixed-side vertical rods such that the plurality of fixed-side vertical rods and the plurality of fixed-side horizontal rods form a first grid structure, and
    wherein the movable rack comprises a plurality of movable-side vertical rods such that the plurality of movable-side vertical rods and the plurality of movable-side horizontal rods form a second grid structure.

2. The draining rack for a cleaning sponge according to claim 1, wherein the fixed rack comprises a stopper member, wherein the movable rack is configured to be received in an opening defined by the stopper member, wherein the movable rack comes in contact with the stopper member in the tilted position.

3. The draining rack for a cleaning sponge according to claim 1, wherein when the draining rack is in the upright position, the fixed-side horizontal rods are arranged on a front side of the fixed-side frame portion, the movable-side horizontal rods are arranged on a rear side of the movable-side frame portion, and the fixed-side horizontal rods and the movable-side horizontal rods are alternately arranged in a vertical direction.

4. The draining rack for a cleaning sponge according to claim 1, wherein the fixed-side frame portion has a first wire diameter that is greater than a second wire diameter of the fixed-side horizontal rods, and wherein the movable-side frame portion has a third wire diameter that is greater than a fourth wire diameter of the movable-side horizontal rods.

5. The draining rack for a cleaning sponge according to claim 3, wherein the fixed-side frame portion has a first wire diameter that is greater than a second wire diameter of the fixed-side horizontal rods, and wherein the movable-side frame portion has a third wire diameter that is greater than a fourth wire diameter of the movable-side horizontal rods.

* * * * *